Patented Jan. 7, 1936

2,027,199

UNITED STATES PATENT OFFICE 2,027,199

CONDENSATION PRODUCT

Walter Reppe and Ernst Keyssner, Ludwigshafen-on-the-Rhine, Germany, assignors to I. G. Farbenindustrie Aktiengesellschaft, Frankfort-on-the-Main, Germany No Drawing. Application November 15, 1933, Serial No. 698,074. In Germany November 23, 1932

11 Claims. (Cl. 260—2)

The present invention relates to condensation products from hydroxylated cyclic compounds and acetylene and to a process of producing the same.

In the application Ser. No. 678,478, filed June 30th, 1933, we have described a process for the production of condensation products according to which acetylene is caused to act at between about 100° and about 300° C. on hydroxylated cyclic compounds in the presence of organic zinc or cadmium salts.

We have now found that valuable condensation products are likewise obtained by causing acetylene to act at between about 100° and about 300° C., preferably at between about 180° and about 240° C., on mono- or polyhydric hydroxy compounds of the mono- or poly-, iso- or heterocyclic series, or mixtures of such compounds, in the presence of organic nitrogenous bases, especially amines. Since water retards the reaction, it is advisable to work in the absence of water or at least to keep the water-content of the reaction mixture low.

Said organic bases comprise for example mono-, di- and tri-methyl amine, methyl-ethyl amine, methyl-propyl amine, mono-, di- and triethyl, -propyl, -butyl, -octyl amines, and like primary, secondary or tertiary alkyl amines; alkylol amines, such as ethanol, propanol, or butanol amines, alkyl-alkylol amines, such as monomethyl diethanol amine, cycloalkyl amines, such as cyclohexyl amine, di- and polyamines, such as pentamethylene diamine, aromatic amines, such as aniline, N-methyl aniline, naphthyl amines and like homologues of aniline, heterocyclic bases, such as pyridine, piperidine, quinoline and the like. It will be understood that the said organic bases suitable as catalysts according to the present invention preferably consist of carbon, hydrogen and nitrogen; oxygen-containing cyclic bases such as p-amino-phenol may also be employed but their efficiency is not very strong. Mixtures of the said bases may also be employed. It is also possible to employ the said bases together with the zinc or cadmium salts of organic acids, such as acetic acid, propionic acid, butyric acid, oleic acid or abietic acid, referred to in our aforesaid application Ser. No. 678,478.

As suitable hydroxylated cyclic compounds may be mentioned phenolic compounds, such as phenol, ortho-, meta- and para-cresol, the different xylenols, pseudo-cumenol, carvacrol, thymol, catechol, resorcinol, orcinal, pyrogallol, phloroglucinol, alpha-naphthol, beta-naphthol, alkylated naphthols, partially hydrogenated aromatic phenolic compounds, such as tetra-hydronaphthol, cycloaliphatic hydroxy compounds, such as cyclo-hexanol and heterocyclic hydroxy compounds, such as hydroxylated pyridine, quinoline and methyl quinoline and halogenation and sulphonation products of said hydroxylated cyclic compounds, such as for example chlorinated phenol or naphthol and sulphonic acids of phenol or naphthol.

If desired the reaction may be carried out in the presence of solvents, as for example alcohols, such as methanol, ethanol, butanol or propanol, or ketones, such as acetone, methyl ethyl ketone or cyclohexanone, or esters, as for example ethyl acetate or butyl acetate, or hydrocarbons of the aliphatic, aromatic or hydroaromatic series, such as ligroin, gasoline fractions, benzene, toluene, or tetra- or decahydronaphthalene. Moreover, substances which form liquid or solid solutions with the initial materials and/or the condensation products or which serve merely as fillers, may be also added to the reaction mixture; such substances are for example waxes, fatty oils and fats, resins, resin esters and gums, asbestos, cellulose, and cellulose esters or ethers, gypsum, chalk and like fillers.

The reaction is preferably carried out at a pressure above atmospheric pressure. It is possible to work discontinuously (for example in stirring autoclaves) or continuously (in a pressure tower). The reaction may be carried out until complete saturation of the hydroxylated cyclic compounds with acetylene occurs, or it may be interrupted prematurely. It must be kept in mind, when working at superatmospheric pressure, that acetylene is liable to explode. It is therefore advisable to dilute the acetylene with an inert gas, as for example nitrogen, carbon dioxide, hydrogen, methane, ethane, ethylene or sulphur dioxide.

The reaction is usually carried out at a pressure between about 2 and about 25, preferably between about 15 and about 20, atmospheres, and at temperatures between about 100 and about 300, preferably between about 180 and about 240° C.

The organic bases are generally employed in a quantity of between about 1 and about 20 per cent by weight of the hydroxylated cyclic compounds, usually in an amount of between about 1 and about 5 per cent.

Depending on the temperature, amount of catalyst and duration of reaction, from viscous to semi-hard or hard products are obtained which are readily soluble, partly soluble or only capable of swelling in organic solvents, such as acetone, methanol, ethanol, diethyl ether and benzene and in fatty oils and aqueous caustic alkalies, such as caustic soda or potash.

The condensation products obtainable in the said manner may be employed either directly or after previous purification in the preparation of lacquers, varnishes and insulating agents and in the artificial material industries. For the purpose of purification, the resin may be dissolved in a solvent, as for example ethyl alcohol or benzene, the solution treated with bleaching earth, fuller's earth or active carbon, or a chemical bleaching agent, as for example sodium hydrosulphite, filtered and subjected to distillation at atmospheric or reduced pressure, any hydroxylated cyclic compound which has not been converted being distilled off at the same time. Alternatively, any unconverted hydroxylated cyclic compound present may be expelled by means of water or superheated steam before the dissolution in organic solvents. In cases when the products are still soluble in aqueous caustic alkalies, it is possible to purify them by dissolution in alkali and precipitation by means of acids. The soluble and the insoluble solid products may also be purified in a finely ground condition by treatment with acids or alkalies, dilute aqueous solutions of caustic alkali being employed for purifying products which are insoluble in caustic alkali solutions, and aqueous solutions of alkali metal carbonates being suitable for the treatment both of the insoluble and of the soluble products.

The condensation products may be subjected to a subsequent hardening with aldehydes or substances which split off aldehydes, as for example hexamethylene tetramine. Catalysts, such as sulphuric acid, organic sulphonic acids from aliphatic or aromatic compounds, resinic acids, fatty acids, aqueous caustic alkalies or organic bases, such as cyclohexylamine may be added during this process if desired. Similarly solvents of low or high boiling point may be present during the hardening, in which case the employment of organic bases as catalyst is especially favourable, the solvents of high boiling point being left in the hardened products if desired. Moreover, filling materials, such as asbestos fibres, gypsum or wood powder, may be added before the hardening which remain finely divided in the finished product; or substances may be added which enter into solid solutions with the finished product, for example cellulose ethers, polymerization products, as for example polymerized vinyl esters, polymerized styrene, polymerized acrylic acid and their derivatives, artificial or natural resins and resin esters, a far reaching influence on the properties of the final products thus being possible.

New products are also obtained by a complete or partial esterification of the condensation products with organic, saturated or unsaturated, lower or higher acids, such as fatty acids, aromatic acids, hydroxy acids, ether acids, as for example diglycollic acid, amino acids or polybasic acids, as for example phthalic acid, succinic acid, adipic acid, suberic acid, citric acid or tartaric acid or mixtures of these acids.

The condensation products may also be sulphonated (products having the character of tanning agents being obtained), nitrated, chlorinated, coupled with diazo compounds or converted into the corresponding glycol ethers by treatment with ethylene oxide.

For causing the phenol groups to react, the alkali salts of the phenol resins may be employed; these salts may be brought into reaction with halogen compounds, such as methyl iodide, chlorhydrins, chloracetic acid or acid chlorides, or with dimethyl or diethyl sulphate.

The following examples will further illustrate the nature of this invention but the invention is not restricted to these examples. The parts are by weight.

*Example 1*

500 parts of phenol and 20 parts of cyclohexylamine are charged into a rotary autoclave. The autoclave is rinsed with nitrogen, and then filled with nitrogen until the pressure is 5 atmospheres and then with acetylene until the pressure is 15 atmospheres. The autoclave is then heated to 180° C. and acetylene is pressed in while keeping the pressure at 20 atmospheres until about 90 parts of acetylene have been absorbed. The resulting product is purified by solution in benzene and treatment of the solution with from about 5 to about 15 per cent of bleaching earth. After distilling off the benzene, a resin having a softening point of 150° C. (according to Krämer-Sarnow) remains behind.

*Example 2*

500 parts of phenol and 20 parts of cyclohexylamine are treated with acetylene in the manner described in Example 1 until 115 parts of acetylene have been absorbed. The resulting brown coloured but clear resin is insoluble in the usual solvents, such as benzene, benzine, ethyl alcohol, acetone and diethyl ether. It softens when heated without melting.

*Example 3*

500 grams of commercial xylenol (mixture of isomers) and 20 parts of mono-n-butylamine are treated with acetylene as described in Example 1 until 145 grams of acetylene have been absorbed. The product has a softening point of 95° C. after purification with bleaching earth as described in Example 1.

*Example 4*

500 parts of phenol and 20 parts of piperidine are treated with acetylene in the manner described in Example 1 until 120 parts of acetylene have been absorbed. The brown resin obtained is insoluble in benzine and benzene and soluble in ethyl alcohol acetone and aqueous solutions of sodium hydroxide.

*Example 5*

500 parts of phenol and 20 parts of monoethanolamine are treated with acetylene in the manner described in Example 1 until acetylene is no longer absorbed. The resin obtained softens without melting, when heated. It is partly soluble in acetone.

What we claim is:—

1. The process of producing condensation products which comprises causing acetylene to act at between about 100° and about 300° C. on a cyclic organic compound being hydroxylated in the nucleus in the presence as catalyst of an organic base having a strongly basic action and being capable of withstanding the reaction temperature, the base being inert to the said hydroxylated cyclic organic compound at the reaction temperature employed.

2. The process of producing condensation products which comprises causing acetylene to act at between about 180 and about 240° C. on a cyclic organic compound being hydroxylated in the nucleus in the presence as catalyst of an organic base having a strongly basic action and being capable of withstanding the reaction temperature, the base being inert to the said hydroxylated cyclic organic compound at the reaction temperature employed.

3. The process of producing condensation products which comprises causing acetylene to act at between about 100° and about 300° C., at a pressure above atmospheric pressure, on a cyclic organic compound being hydroxylated in the nucleus in the presence as catalyst of an organic base having a strongly basic action and being capable of withstanding the reaction temperature, the base being inert to the said hydroxylated cyclic organic compound at the reaction temperature employed.

4. The process of producing condensation products which comprises causing acetylene to act at between about 100° and about 300° C. on a cyclic organic compound being hydroxylated in the nucleus in the presence as catalyst of an organic nitrogenous base selected from the class consisting of the aliphatic, aromatic amines, heterocyclic amines containing nitrogen in the ring and hydroxylated aliphatic and aromatic amines the amine employed being inert to the said hydroxylated cyclic organic compound at the reaction temperature employed.

5. The process of producing condensation products which comprises causing acetylene to act at between about 180 and about 240° C. on a cyclic organic compound being hydroxylated in the nucleus in the presence as catalyst of an organic nitrogenous base selected from the class consisting of the aliphatic, aromatic amines, heterocyclic amines containing nitrogen in the ring and hydroxylated aliphatic and aromatic amines the amine employed being inert to the said hydroxylated cyclic organic compound at the reaction temperature employed.

6. The process of producing condensation products which comprises causing acetylene to act at between about 100° and about 300° C., at a pressure above atmospheric pressure, on a cyclic organic compound being hydroxylated in the nucleus in the presence as catalyst of an organic nitrogenous base selected from the class consisting of the aliphatic, aromatic amines, heterocyclic amines containing nitrogen in the ring and hydroxylated aliphatic and aromatic amines the amine employed being inert to the said hydroxylated cyclic organic compound at the reaction temperature employed.

7. The process of producing condensation products which comprises causing acetylene to act at between 100° and about 300° C., at a pressure above atmospheric pressure, on a cyclic organic compound being hydroxylated in the nucleus in the presence as catalyst of an organic amine the amine employed being inert to the said hydroxylated cyclic organic compound at the reaction temperature employed.

8. The process of producing condensation products which comprises causing acetylene to act at between about 100° and about 300° C., at a pressure above atmospheric pressure, on a phenol in the presence as catalyst of an organic amine the amine employed being inert to phenols at the reaction temperature employed.

9. A resinous condensation product obtainable from 1 molecular proportion of a phenol and at least 1 molecular proportion of acetylene, in the presence as catalyst of an organic nitrogenous base selected from the class consisting of the aliphatic, aromatic amines, heterocyclic amines containing nitrogen in the ring and hydroxylated aliphatic and aromatic amines the amine employed being inert to phenols at the reaction temperature employed.

10. A resinous condensation product obtainable from 1 molecular proportion of a phenol and at least one molecular proportion of acetylene, in the presence as catalyst of an organic nitrogenous base selected from the class consisting of the aliphatic, aromatic amines, heterocyclic amines containing nitrogen in the ring and hydroxylated aliphatic and aromatic amines under increased pressure, the amine employed being inert to phenols at the reaction temperature employed.

11. A resinous condensation product obtainable from 1 molecular proportion of phenol and at least one molecular proportion of acetylene, in the presence as catalyst of an organic nitrogenous base selected from the class consisting of the aliphatic, aromatic amines, heterocyclic amines containing nitrogen in the ring and hydroxylated aliphatic and aromatic amines, the amine employed being inert to phenols at the reaction temperature employed, the resulting product being insoluble in benzene and softening when heated without melting.

WALTER REPPE.
ERNST KEYSSNER.